(12) United States Patent
Hyun

(10) Patent No.: US 11,116,602 B2
(45) Date of Patent: Sep. 14, 2021

(54) DENTAL IMPLANT SURGICAL METHOD USING GUIDE PIN

(71) Applicant: Young Keun Hyun, Seoul (KR)

(72) Inventor: Young Keun Hyun, Seoul (KR)

( * ) Notice: Subject to any disclaimer, the term of this patent is extended or adjusted under 35 U.S.C. 154(b) by 367 days.

(21) Appl. No.: 16/262,960

(22) Filed: Jan. 31, 2019

(65) Prior Publication Data

US 2019/0159864 A1    May 30, 2019

Related U.S. Application Data

(63) Continuation-in-part of application No. 15/828,372, filed on Nov. 30, 2017, now Pat. No. 10,327,864, which is a continuation of application No. PCT/KR2017/001942, filed on Feb. 22, 2017.

(30) Foreign Application Priority Data

Mar. 17, 2016 (KR) .......................... 10-2016-0032135
Sep. 2, 2016 (KR) .......................... 10-2016-0112921

(51) Int. Cl.
*A61C 1/08* (2006.01)
*A61C 8/00* (2006.01)

(52) U.S. Cl.
CPC ............ *A61C 1/084* (2013.01); *A61C 8/0089* (2013.01)

(58) Field of Classification Search
CPC ....... A61C 8/00; A61C 8/0019; A61C 8/0021; A61C 8/0031; A61C 8/0082–0084; A61C 8/0089–0092; A61C 5/46; A61C 5/48; A61C 5/88
See application file for complete search history.

(56) References Cited

U.S. PATENT DOCUMENTS

| | | | | |
|---|---|---|---|---|
| 3,436,826 A * | 4/1969 | Edelman | ................ | A61C 8/001 |
| | | | | 433/75 |
| 5,688,283 A * | 11/1997 | Knapp | .................... | A61C 1/084 |
| | | | | 433/75 |
| 5,842,859 A * | 12/1998 | Palacci | .................. | A61C 1/084 |
| | | | | 433/72 |
| 7,014,461 B2 * | 3/2006 | Weinstein | .............. | A61B 90/11 |
| | | | | 433/76 |
| 7,104,795 B2 * | 9/2006 | Dadi | ...................... | A61C 1/084 |
| | | | | 433/72 |
| 7,654,823 B2 * | 2/2010 | Dadi | ...................... | A61C 1/084 |
| | | | | 433/72 |
| 7,682,151 B2 * | 3/2010 | Jofre Araya | ........... | A61C 1/084 |
| | | | | 433/75 |
| 9,192,451 B2 * | 11/2015 | Sapian | ..................... | A61C 3/03 |
| 9,675,425 B2 * | 6/2017 | Oppenheimer | ........ | A61C 1/084 |
| 2004/0219476 A1 * | 11/2004 | Dadi | ...................... | A61C 1/084 |
| | | | | 433/72 |

(Continued)

*Primary Examiner* — Edward Moran
*Assistant Examiner* — Matthew P Saunders
(74) *Attorney, Agent, or Firm* — JCIPRNET

(57) ABSTRACT

Provided is a non-incisional dental implant surgical method, and more particularly, a non-incisional dental implant surgical method using a guide pin, whereby a dental implant surgery may be conducted accurately by easily determining an outer shape of an alveolar bone of a patient, into which an implant fixture is to be placed, when forming an implant hole in the alveolar bone and placing the implant fixture in the implant hole to place an implant in the alveolar bone of the patient.

12 Claims, 8 Drawing Sheets

(56) References Cited

U.S. PATENT DOCUMENTS

| | | | |
|---|---|---|---|
| 2006/0194166 A1* | 8/2006 | Jofre Araya | A61C 1/084 433/72 |
| 2008/0032258 A1* | 2/2008 | Kyung | A61C 8/0089 433/75 |
| 2010/0304328 A1* | 12/2010 | Schweizer | A61C 8/0089 433/141 |
| 2014/0051033 A1* | 2/2014 | Wang | A61C 9/00 433/72 |
| 2014/0349252 A1* | 11/2014 | Jofre Araya | A61C 1/084 433/174 |
| 2018/0085190 A1* | 3/2018 | Hyun | A61C 8/0089 |

* cited by examiner

DENTAL IMPLANT SURGICAL METHOD USING GUIDE PIN

CROSS-REFERENCE TO RELATED APPLICATION

This application is a continuation in part of co-pending U.S. patent application Ser. No. 15/828,372 filed Nov. 30, 2017, which claims the priority benefit of an International PCT Application No. PCT/KR2017/001942, filed on Feb. 22, 2017, which claims the priority benefit of Korean Patent Application No. 10-2016-0032135, filed on Mar. 17, 2016 and Korean Patent Application No. 10-2016-0112921, filed on Sep. 2, 2016, in the Korean Intellectual Property Office, the disclosure of which is incorporated herein in its entirety by reference.

BACKGROUND

1. Field

One or more embodiments relate to a non-incisional dental implant surgical method, and more particularly, to a non-incisional dental implant surgical method using a guide pin whereby a dental implant surgery may be conducted accurately by easily determining an outer shape of an alveolar bone of a patient, into which an implant fixture is to be placed, when forming an implant hole in the alveolar bone and placing the implant fixture in the implant hole to place an implant in the alveolar bone of the patient.

2. Description of the Related Art

In general, a dental implant consists of a fixture, an abutment, and a crown.

The fixture includes a male screw portion to be inserted into the alveolar bone of a person to support and fix the implant overall.

The abutment is mounted to be coupled to an upper portion of the fixture to be exposed above the gingiva.

The crown is a type of prosthesis replacing a natural tooth, and is formed to fit with the abutment to be adhered and fixed to the abutment.

When carrying out an implant surgery as described above, first, an implant hole is formed to insert a fixture into the alveolar bone. To form an implant hole, first, the shape of the alveolar bone is determined based on an image of a site where the implant hole is to be formed, captured by using X-ray or computerized tomography (CT). A plan is set up to form an implant hole based on the shape of the alveolar bone determined through X-ray or CT, and then the practitioner drills a hole (implant hole) into the alveolar bone of the patient by using a drill according to the plan. During the process in which the practitioner drills an implant hole into the alveolar bone of the patient, it is impossible or highly difficult to check an X-ray or CT image in real time.

Even when the practitioner is cognizant of the shape of the alveolar bone, it is very difficult to form an implant hole at an accurate position and in an accurate direction by considering a three-dimensional shape and position of the alveolar bone in a real procedure. This is because the alveolar bone is covered by the gingiva and thus the practitioner cannot identify the shape of the alveolar bone inside the gingiva with unaided eyes.

If the direction or position of an implant hole formed by the practitioner is incorrect, an implant may have to be placed again. Incorrect position and direction of an implant hole can lower the overall success rate of implant surgery and cause a high degree of inconvenience to the patient. The risk of medical malpractice exists according to circumstances.

Due to the above problems, according to the related art, in some cases, an incision is made in the gingiva of a patient to expose the alveolar bone, and an implant hole is formed by checking the shape of the alveolar bone with unaided eyes. In this case, however, since the implant surgery is conducted by cutting the gingiva of the patient, it is very inconvenient for the patient, and the recovery time is long.

Thus, in the procedure of forming an implant hole in the alveolar bone of a patient and placing a dental implant, a method of placing a dental implant by effectively determining the shape of the alveolar bone of the patient without cutting the gingiva of the patient is necessary.

SUMMARY

One or more embodiments include a non-incisional dental implant surgical method, in which a dental implant procedure may be performed by a practitioner by determining the shape (direction and width) of the alveolar bone of a patient without making an incision in the gingiva of the patient when forming an implant hole in the alveolar hole by using a drill.

Additional aspects will be set forth in part in the description which follows and, in part, will be apparent from the description, or may be learned by practice of the presented embodiments.

According to one or more embodiments, a non-incisional dental implant surgical method includes: (a) inserting an insertion portion of at least one guide pin between an alveolar bone and a periosteal membrane, wherein the guide pin includes the insertion portion extending in a length direction so as to be inserted between the alveolar bone and the periosteal membrane and a guide portion coupled to the insertion portion; and (b) drilling an implant hole for a dental implant, into the alveolar bone by referring to the guide portion of the guide pin exposed outside the gingiva; (c) inserting a fixture for a dental implant into the implant hole formed in (b); and (d) pulling out the guide pin that is inserted in (a) from between the alveolar bone and the periosteal membrane.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a non-incisional dental implant surgical method according to the present disclosure will be described in detail with reference to the attached drawings.

First, a structure of a guide pin used in performing a non-incisional dental implant surgical method according to the present disclosure will be described.

Figure 1:
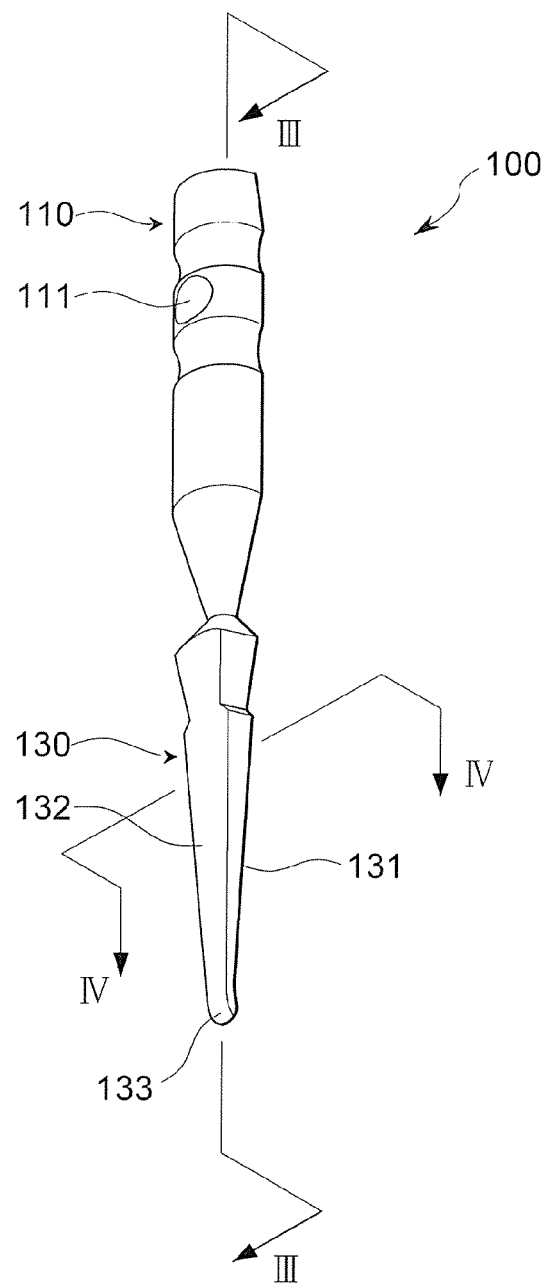
FIG. 1 is a perspective view of a guide pin used in a non-incisional dental implant surgical method according to the present disclosure.
Figure 2:
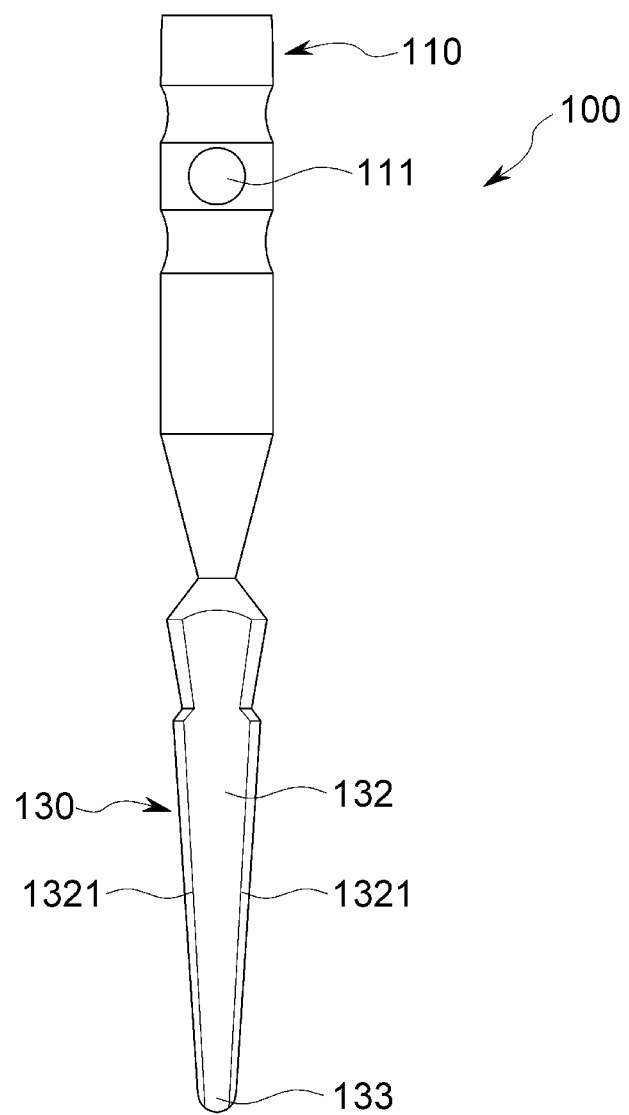
FIG. 2 is a rear view of the guide pin illustrated in FIG. 1.

FIG. 1 is a perspective view of a guide pin 100 used in a non-incisional dental implant surgical method according to the present disclosure. FIG. 2 is a rear view of the guide pin 100 illustrated in FIG. 1.

Referring to FIGS. 1 and 2, the guide pin 100 used in a non-incisional dental implant surgical method according to an embodiment of the present disclosure includes an insertion portion 130 and a guide portion 110.

The guide portion 110 is formed in a rod shape extending in a length direction. The guide portion 110 is formed in a form that a practitioner may easily grasp using the finger or an additional tool. The guide portion 110 according to the present embodiment has a semi-cylindrical shape having a plurality of ring-shaped grooves on an outer circumference thereof. The plurality of ring-shaped grooves formed on the guide portion 110 enable a user to easily grasp the guide portion 110.

A tie hole 111 passing through a body of the guide portion 110 is formed in the guide portion 110. The tie hole 111 is formed to thread the guide portion 110 so as to easily tie the guide portion 110.

The insertion portion 130 is coupled to a lower portion of the guide portion 110. The insertion portion 130 extends in a length direction so as to be poked and inserted between an alveolar bone 1 and a periosteal membrane 3. When the insertion portion 130 is inserted between the alveolar bone 1 and the periosteal membrane 3, the guide portion 110 is exposed outside a gingiva 2, thereby guiding an inclination of the alveolar bone 1.

The insertion portion 130 includes a bone contact portion 131, a periosteal membrane contact portion 132, and a curved portion 133.

As illustrated in FIG. 1, the bone contact portion 131 has a planar shape so as to be closely contacted by the alveolar bone 1 in a direction facing the alveolar bone 1. According to circumstances, the bone contact portion 131 may be formed concavely so as to correspond to the shape of an outer surface of the alveolar bone 1. A portion of the bone contact portion 131 facing the alveolar bone 1 may have a low surface roughness. When the bone contact portion 131 has a low surface roughness, the insertion portion 130 may be easily inserted between the periosteal membrane 3 and the bony tissues of the alveolar bone 1 while the insertion portion 130 is being closely adhered to the alveolar bone 1.

Figure 3:
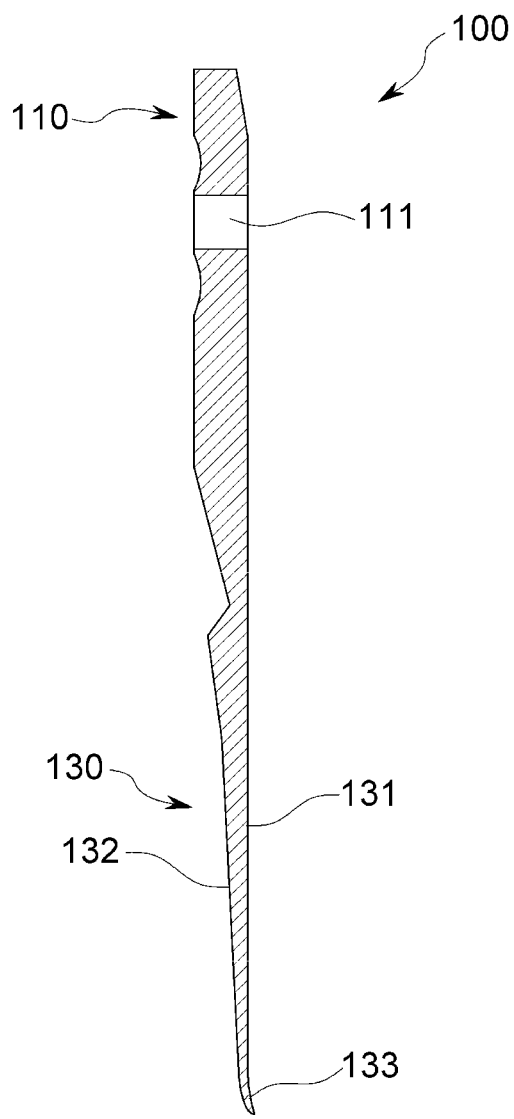
FIG. 3 is a cross-sectional view of the guide pin illustrated in FIG. 1, taken along line III-III.
Figure 4:
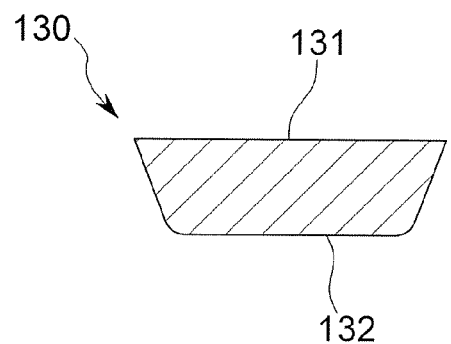
FIG. 4 is a cross-sectional view of the guide pin illustrated in FIG. 1, taken along line IV-IV.

The periosteal membrane contact portion 132 is formed on a surface of the insertion portion 130 opposite to the bone contact portion 131. The periosteal membrane contact portion 132 is formed to protrude with respect to a direction facing the periosteal membrane 3. Referring to FIGS. 2 and 3, a protruding ridge 1321 of the periosteal membrane contact portion 132 is formed to extend along an extension direction of the insertion portion 130. Here, the ridge 1321 is defined as a line connecting portions of the periosteal membrane contacting portion 132 protruding at the highest heights. In the present embodiment, the periosteal membrane contacting portion 132 is convexly formed so that the ridge 1321 of the periosteal membrane contacting portion 132 is formed along the extension direction of the insertion portion 130. Referring to FIG. 4, the periosteal membrane contact portion 132 has a convex cross-sectional shape protruding with respect to the bone contact portion 131.

The periosteal membrane contact portion 132 pushes the periosteal membrane 3 and the gingiva 2 outwardly when the insertion portion 130 is inserted between the periosteal membrane 3 and the bony tissues of the alveolar bone 1, thereby forming an entry path of the insertion portion 130. While the insertion portion 130 is inserted, the periosteal membrane contact portion 132 is pressed and fixed by a restoring force of the gingiva 2 that tends to return to its original state. As both sides of the periosteal membrane contact portion 132 having a convex shape, with respect to the ridge 1321, are pressed by the gingiva 2, shaking of the insertion portion 130 to the left and right may be prevented.

Referring to FIGS. 1 and 3, the curved portion 133 is disposed at an end portion of the insertion portion 130. When the practitioner pushes the insertion portion 130 between the alveolar bone 1 and the gingiva 2 while holding the guide portion 110 with a hand or by using a tool such as forceps, the curved portion 133 has a function of separating an outer surface of the alveolar bone 1 and the periosteal membrane 3 from each other. The curved portion 133 has a sharply curved shape bending at the end portion of the insertion portion 130 toward the bone contact portion 131. Due to the bent shape of the curved portion 133, the curved portion 133 helps the end portion of the insertion portion 130 maintain contact with the alveolar bone 1 when the insertion portion 130 is inserted between the alveolar bone 1 and the periosteal membrane 3. The curved portion 133 having the above structure performs a function of accurately separating the outer surface of the alveolar bone 1 and the periosteal membrane 3. The curved portion 133 bent toward the bone contact portion 131 as described above guides an entry direction of the insertion portion 130 to face the alveolar bone 1 to thereby prevent the insertion portion 130 from poking the periosteal membrane 3 or the gingiva 2.

Hereinafter, an operation of performing the non-incisional dental implant surgical method according to the present disclosure by using the guide pin 100 configured as described above will be described with reference to FIGS. 5 through 10.

Figure 5:
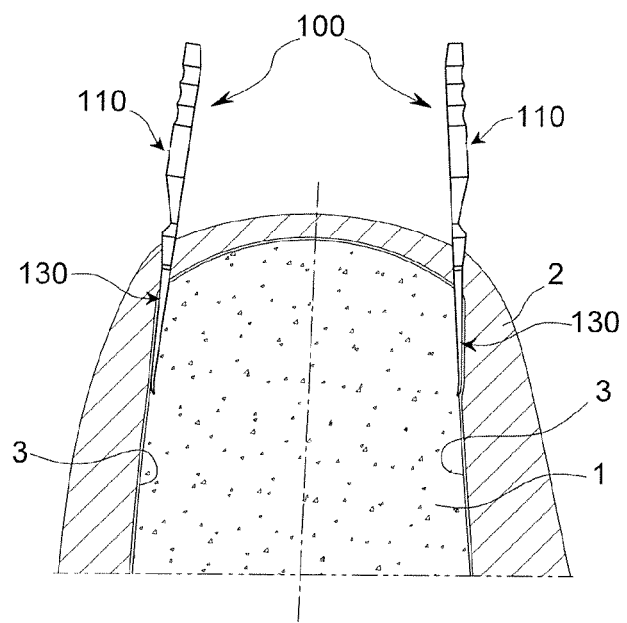
FIGS. 5 through 10 illustrate how a guide pin is used to explain the non-incisional dental implant surgical method according to the present disclosure.

First, as illustrated in FIG. 5, the practitioner inserts the insertion portion 130 of the guide pin 100 between the alveolar bone 1 and the periosteal membrane 3 (step (a)).

The practitioner holds the guide portion 110 of the guide pin 100 with the fingers or using another tool. Then the practitioner places the bone contact portion 131 of the insertion portion 130 to face the alveolar bone 1, and then locates an end of the curved portion 133 in a site between the alveolar bone 1 and the gingiva 2 where an implant hole is to be formed. In this state, the practitioner pushes the guide portion 110 downward to stick the curved portion 133 of the insertion portion 130 between the alveolar bone 1 and the periosteal membrane 3 to be in a state as illustrated in FIG. 5. The insertion portion 130 is inserted between the alveolar bone 1 and the periosteal membrane 3.

Here, the curved portion 133 is inserted between the alveolar bone 1 and the periosteal membrane 3 while separating the alveolar bone 1 and the periosteal membrane 3 from each other. As the curved portion 133 is bent toward the bone contact portion 131, the practitioner may effectively insert the curved portion 133 by sensing, using the guide portion 110, the curved portion 133 maintaining a contact state with the alveolar bone 1.

When the insertion portion 130 is inserted between the alveolar bone 1 and the periosteal membrane 3, the bone contact portion 131 contacts the alveolar bone 1 and the periosteal membrane contact portion 132 contacts the periosteal membrane 3 as illustrated in FIG. 5. The protruding ridge 1321 of the periosteal membrane contact portion 132 performs the functions of widening a gap with respect to the periosteal membrane 3 to provide an entry path of the insertion portion 130 and holding the insertion portion 130 to prevent shaking of the insertion portion 130 to the left and right.

While the insertion portion 130 is inserted between the alveolar bone 1 and the periosteal membrane 3 as described above, the guide portion 110 is in a protruded state according to an inclination of the outer surface of the alveolar bone 1 near the site where an implant hole is to be formed.

In the present embodiment, as illustrated in FIGS. 5 through 10, the practitioner inserts one guide pin 100 into each of the buccal side and the lingual side (an inner side and an outer side) of the alveolar bone 1, that is, a total of two guide pins 100.

As illustrated in FIGS. 5 through 10, the structures of the alveolar bone 1 and the gingiva 2 are different for each person, and thus, in many cases, the shape of the gingiva 2 appearing on the outer side and the shape of the alveolar bone 1 located inside the gingiva 2 are different. FIGS. 5 through 10 illustrate examples of various inclination structures of the alveolar bone 1 and the gingiva 2. The practitioner may easily determine widths of the alveolar bone 1 inside the gingiva 2 and an inclination direction of the outer surface of the alveolar bone 1 by inserting the guide pins 100 between the alveolar bone 1 and the periosteal membrane 3 respectively on the buccal side and the lingual side.

The practitioner may determine the shape and inclination of the alveolar bone 1 covered by the gingiva 2 based on the position and inclination of the guide portion 110 as described above, without using an image such as a computerized tomography (CT) image or an X-ray image. The practitioner may form an implant hole 4 at an accurate position and in an accurate direction by referring to the position and direction of the guide portion 110 exposed to the outside. That is, a distance between the inner side and the outer side of the alveolar bone 1 and an inclination of the alveolar bone 1 may be accurately determined by using the two guide pins 100.

Meanwhile, accidents may be prevented by threading the tie hole 111 formed in the guide portion 110 as described above. Due to the relatively small size of the guide pins 100, during an operation of performing step (a), there is a possibility that the guide pins 100 of the practitioner may slip out of the hand and fall into the mouth of the patient. To prepare against this, by threading the tie hole 111 using a thread, the guide pins 100 may be easily found or taken out by using the thread.

The practitioner drills an implant hole 4 for dental implant, into the alveolar bone 1 by referring to the guide portion 110 of the guide pins 100 exposed to the outside (step (b)).

The implant hole 4 may be formed in the alveolar bone 1 by referring to the guide portion 110 of the guide pins 100 by using various methods. One representative method is to form the implant hole 4 in a center position between the guide portions 110 of the two guide pins 100 at a middle angle. Forming the implant hole 4 to pass by a center portion of the alveolar bone 1 by considering a thickness and direction of the alveolar bone 1 may be advantageous to dental implant surgery. The practitioner may form the implant hole 4 in the alveolar bone 1 in a middle position between the guide portions 110 at an angle corresponding to a middle of an angle between the two guide portions 110, based on the position and direction of the guide portions 110 of the two guide pins 100 exposed to the outside. FIGS. 5 through 10 respectively illustrates states in which the guide pins 100 are inserted with respect to states of the gingiva 2 and the alveolar bone 1 at different angles. In particular, FIGS. 7 through 10 illustrate states in which an inclination of an outer surface of the gingiva 2 and that of the alveolar bone 1 differ significantly. In FIGS. 5 through 10, by referring to the position and direction of the guide pins 100, a path along which the implant hole 4 is formed is indicated by an alternate long and short dash line. Referring to FIG. 5, an inclination of the alveolar bone 1 is steeper than an angle of the gingiva 2. In the case of FIG. 5, the gingiva 2 on the right side is thicker than the gingiva 2 on the left side. In this case, if the implant hole 4 is formed by considering only the shape of the gingiva 2, it is difficult to form the implant hole 4 in a center portion of the alveolar bone 1. However, according to the present disclosure, by referring to the guide portions 110 of the guide pins 100, the implant hole 4 may be easily formed in the center portion of the alveolar bone 1.

Figure 7:
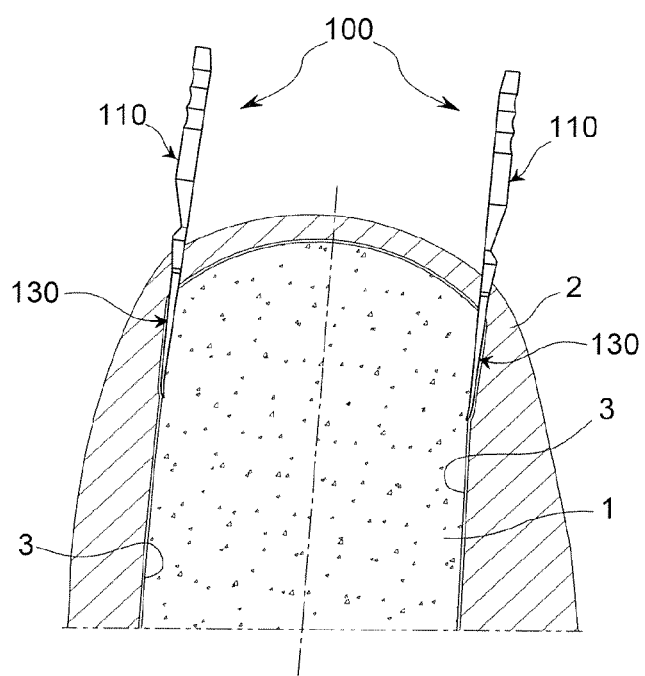

Referring to FIG. 7, an inclination of the alveolar bone 1 on the right is opposite to a direction of an inclination of an outer surface of the gingiva 2. If the implant hole 4 is formed here by considering only the shape of the gingiva 2, the implant hole 4 may be slanted in one direction. However, by referring to the inclination of the guide pins 100 as in the present disclosure, the implant hole 4 may be formed accurately along an inclination direction of the alveolar bone 1 in a center portion of the alveolar bone 1. In FIG. 7, particularly, the implant hole 4 may preferably be formed in a direction parallel to a direction of the guide pins 100.

Figure 9:
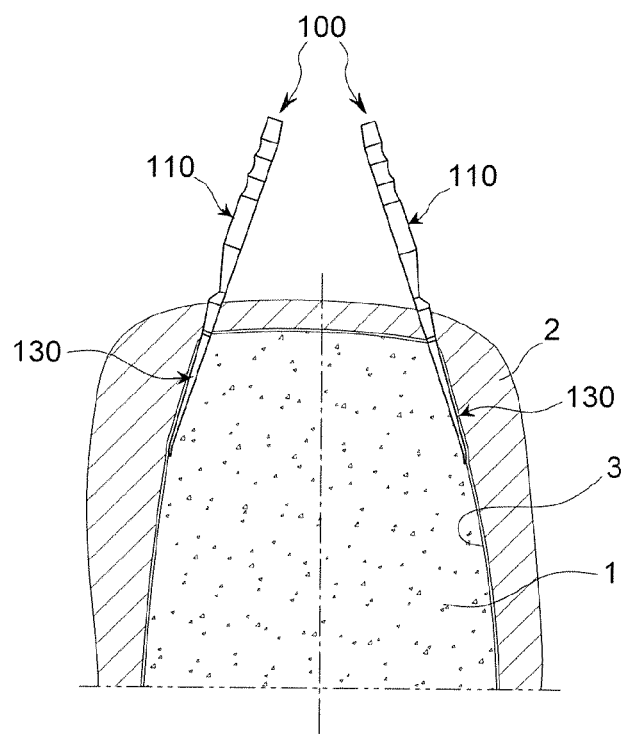

FIG. 9 illustrates an example in which an outer surface inclination of the alveolar bone 1 is gentler than an outer surface inclination of the gingiva 2. In addition, in the case of FIG. 9, the gingiva 2 on the left is thicker than the gingiva 2 on the right side. Also, in this case, by using the above-described method, the implant hole 4 may be formed in a center portion of the alveolar bone 1 in an appropriate direction by referring to a position and inclination of the guide pins 100.

By using the non-incisional dental implant surgical method according to the present disclosure as described above, an implant hole may be formed in a very accurate position and direction.

When forming an implant hole by using the guide pins 100 according to the present disclosure as described above, the practitioner may perform a procedure by checking the shape of the alveolar bone 1 with unaided eyes by using the guide pins 100 during the procedure. Thus, the practitioner may identify the shape of the alveolar bone 1 simply and intuitively, without using an additional imaging device, and form an implant hole 4 in a most appropriate position and direction according to the shape of the alveolar bone 1. Accordingly, the success rate of dental implant surgery may be remarkably increased, and the surgery time may be reduced.

Figure 6:
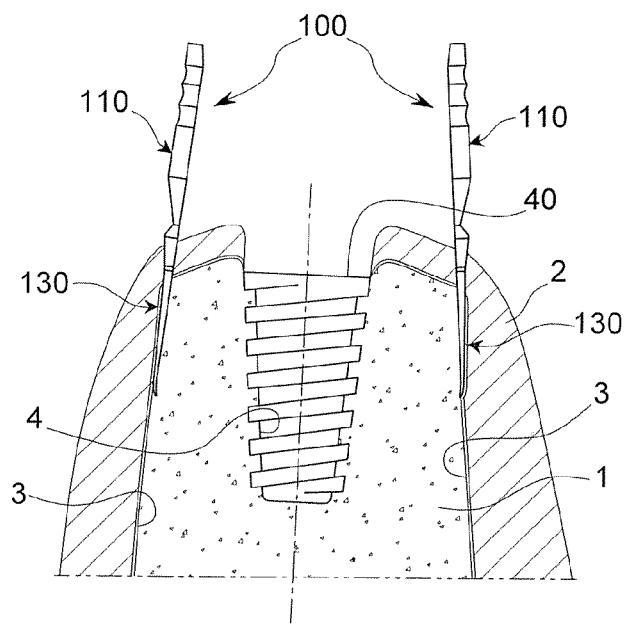
Figure 8:
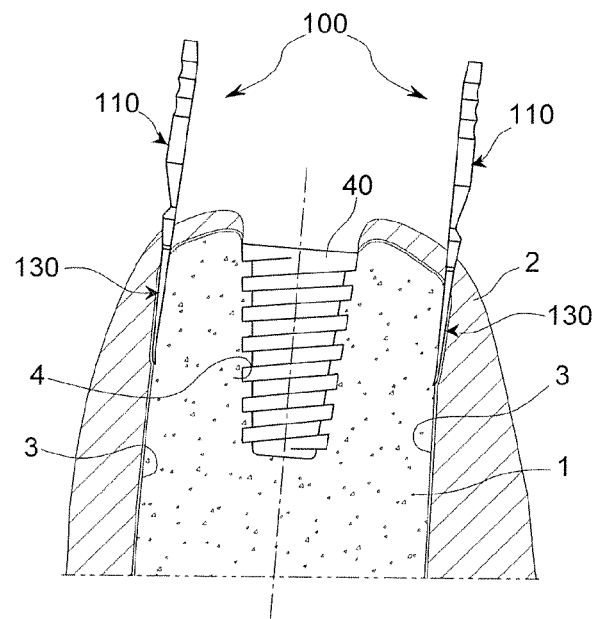
Figure 10:
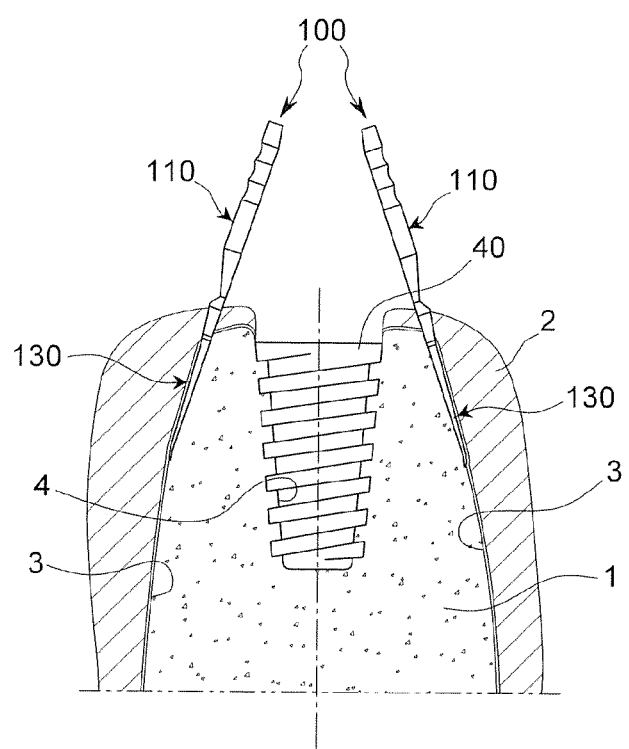

When forming the implant hole 4 is completed in step (b), as illustrated in FIGS. 6, 8, and 10, a fixture 40 for a dental implant is inserted into the implant hole 4 (step (c)). While inserting the fixture 40 into the implant hole 4, the practitioner may finely adjust a direction of the fixture 40. By referring to the direction of the guide pins 100 inserted in step (a), the practitioner may insert the fixture 40 into the implant hole 4 by adjusting a direction of the fixture 40 such that the fixture 40 is inserted toward a center portion of the alveolar bone 1.

When the fixture 40 is inserted into the implant hole 4 as described above, an abutment is installed on the fixture 40, and a crown is fixed on the abutment. The operation of installing an abutment and a crown is identical to that of a typical implant surgery.

When the operation of inserting the fixture 40 into the implant hole 4 is completed, the practitioner pulls out the guide pins 100 inserted in step (a) from the alveolar bone 1 and the periosteal membrane 3 (step (d)). The operation of installing an abutment and a crown may be performed without referring to the guide pins 100. According to circumstances, the guide pins 100 may be pulled out before inserting the fixture 40 into the implant hole 4. However, to increase the quality of an implant surgery by accurately adjusting a direction of the fixture 40, it may be preferable to perform step (c) by referring to a direction of the guide pins 100 while the guide pins 100 are still inserted until the operation of inserting the fixture 40.

By using the guide pins 100 as described above, the implant hole 4 may be formed in an accurate position and direction and the fixture 40 may be inserted without making an incision in the gingiva 2. In addition, by using the guide pins 100, the above-described process may be performed easily, simply, and quickly. According to the present disclosure, a dental implant may be placed accurately and effectively without incising the gingiva 2 of the patient. According to the present disclosure, as the gingiva 2 of the patient is not cut, the inconvenience of the patient may be minimized. In addition, as the gingiva 2 of the patient is not cut, the patient may recover fast.

While the non-incisional dental implant surgical method according to the present disclosure has been described with reference to embodiments, the scope of the present disclosure is not limited to the structures described and illustrated above.

For example, before performing step (a), an operation of forming a guide hole between the alveolar bone 1 and the periosteal membrane 3 by using a pin may be performed first (step (e)). That is, in order to easily perform step (a), step (e) of forming a guide hole in advance in a position where the guide pins 100 are to be inserted may be performed. In this case, the pin used to form a guide hole may preferably be thinner than the insertion portion 130 of the guide pin 100. That is, a thin pin above is inserted between an alveolar bone and a periosteal membrane and then pulled out, and the guide pins 100 are inserted into where the pin has been inserted. As described above, the non-incisional dental implant surgical method may also be performed by performing step (a) by forming a guide hole in advance and then inserting the insertion portion 130 of the guide pins 100 into the guide hole.

In addition, the guide pins 100 used in performing the non-incisional dental implant surgical method of the present disclosure may also have other various structures than the above-described one.

For example, a guide pin 100 in which an indication line is marked on an outer surface of a guide portion may also be formed. By forming an indication line in parallel to an extension direction of the guide portion, the practitioner may better determine a degree of an inclination of the guide portion and refer to the degree of the inclination of the guide portion during the surgery. The indication line may be engraved or embossed in the guide portion or printed in a contrast color of that of the guide portion.

In addition, the structures of the bone contact portion 131, the periosteal membrane contact portion 132, and the curved portion 133 of the insertion portion 130 may be modified to other various structures than those described and illustrated above. Also, an insertion portion 130 that does not include the curved portion 133 described above may also be configured.

Figure 11:
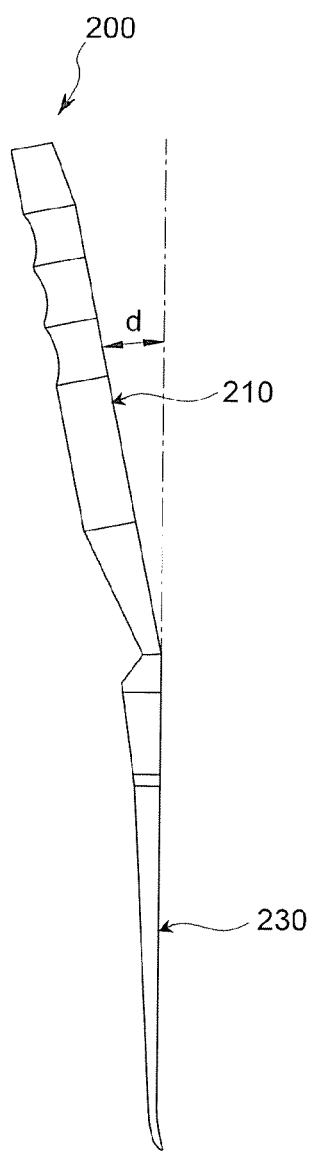
FIG. 11 illustrates a guide pin used in a non-incisional dental implant surgical method, according to another embodiment of the present disclosure.

In addition, while the insertion portion 130 and the guide portion 110 are illustrated as being connected by a straight line in the guide pin 100 described above, according to circumstances, as illustrated in FIG. 11, a guide pin 200 having a structure in which a guide portion 210 is bent at an angle (d) of about 3° to about 25° with respect to an insertion portion 230 to be coupled to the insertion portion 230 may also be configured. In this case, even when the insertion portion 230 is inclined along an inclination of the alveolar bone 1, the guide portion 210 may be disposed in parallel to a direction in which the implant hole 4 is formed or at an angle similar to that parallel direction. The practitioner may better determine a direction in which the implant hole 4 is formed, and also, the effect that a path of a drill used to form the implant hole 4 is not interfered by the guide portion 210 may also be obtained.

In addition, while it is described that an implant hole is formed in step (b) in a middle position between the guide portions of the guide pins inserted in step (a), at a middle angle, according to circumstances, step (b) may also be performed such that an implant hole is formed in a middle position between the guide portions in a direction parallel to an angle of the guide portion of one of the guide pins. The practitioner may adjust a position and direction of the implant hole according to the structure of the alveolar bone of a patient by referring to a position and direction of the guide pins. The practitioner may determine a position and direction of an implant hole by also referring to a position and direction of an occluded tooth in addition to the position and direction of the guide portions.

According to the non-incisional dental implant surgical method of the present disclosure, a practitioner may drill an implant hole after determining an accurate position and shape of the alveolar bone of the patient when drilling the implant hole into the alveolar bone of a patient to place an implant in the alveolar bone, and thus, the success rate of the implant surgery may be increased.

In addition, according to the non-incisional dental implant surgical method of the present disclosure, a dental implant procedure may be performed by forming an implant hole in an accurate position of the alveolar bone without making an incision in the gingiva of the patient, thereby remarkably reducing the inconvenience of the patient and enabling fast recovery of the patient.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:
1. A dental implant surgical method, comprising:
 (a) inserting an insertion portion of at least one guide pin between an alveolar bone and a periosteal membrane, wherein the guide pin comprises the insertion portion extending in a length direction so as to be inserted between the alveolar bone and the periosteal membrane and a guide portion coupled to the insertion portion; and (b) drilling an implant hole for a dental implant, into the alveolar bone by referring to the guide portion of the guide pin exposed outside the gingiva;

(c) inserting a fixture for the dental implant into the implant hole formed in the step (b); and (d) pulling out the guide pin that is inserted in the step (a) from a location between the alveolar bone and the periosteal membrane, wherein the insertion portion of the at least one guide pin used in the step (a) comprises a bone contact portion that is configured to closely adhere the alveolar bone in a direction facing the alveolar bone and a periosteal membrane contact portion protruding in a direction facing the periosteal membrane.

2. The dental implant surgical method of claim 1, wherein the step (a) comprises inserting one guide pin of the at least one guide pin into each of the buccal side of the alveolar bone and into the lingual side of the alveolar bone, and the step (b) comprises drilling the implant hole for the dental implant in a center portion of the alveolar bone by using a position and direction of the guide portions of the guide pins inserted in the step (a) as a guide.

3. The dental implant surgical method of claim 2, wherein the step (b) further comprises drilling the implant hole for the dental implant in a middle position between the guide portions of the guide pins inserted in the step (a).

4. The dental implant surgical method of claim 3, wherein the step (b) further comprises drilling the implant hole for the dental implant in the middle position between the guide portions of the guide pins at an angle corresponding to a middle of an angle between two different guide portions of the different guide pins inserted in the step (a).

5. The dental implant surgical method of claim 4, wherein the step (c) comprises inserting the fixture for the dental implant into the implant hole for the dental implant by referring to the angle of the guide portions of the guide pins inserted in (a).

6. The dental implant surgical method of claim 3, wherein (b) comprises further drilling the implant hole for the dental implant in a direction parallel to the guide portions of the guide pins inserted in the step (a).

7. The dental implant surgical method of claim 1, further comprising (e) forming at least one guide hole between the alveolar bone and the periosteal membrane by using a pin before performing the step (a);

wherein the step (a) comprises inserting the insertion portion of the at least one guide pin into the guide hole formed in the step (e).

8. The dental implant surgical method of claim 1, wherein the insertion portion used in the step (a) further comprises a curved portion that is bent at an end portion of the insertion portion toward the bone contact portion so that the insertion portion is inserted between the alveolar bone and the periosteal membrane by separating the alveolar bone and the periosteal membrane from each other.

9. The dental implant surgical method of claim 1, wherein a protruding ridge of the periosteal membrane contact portion of the insertion portion of the at least one guide pin used in the step (a) extends along an extension direction of the insertion portion.

10. The dental implant surgical method of claim 1, wherein a plurality of protrusions are formed on at least a portion of the periosteal membrane contact portion of the insertion portion.

11. The dental implant surgical method of claim 1, wherein the guide portion of the at least one guide pin of the step (a) is bent at an angle of about 3° to about 25° with respect to the insertion portion to be coupled to the insertion portion.

12. The dental implant surgical method of claim 1, wherein at least one tie hole passing through a body portion of the guide portion is formed in the guide portion of the guide pin of the step (a).

* * * * *